United States Patent
Considine et al.

(10) Patent No.: US 10,803,186 B2
(45) Date of Patent: Oct. 13, 2020

(54) SYSTEMS AND METHODS FOR DYNAMIC APPLICATION MANAGEMENT

(71) Applicant: FMR LLC, Boston, MA (US)

(72) Inventors: Eoghan Considine, Oranmore Galway (IE); John Egan, Dublin (IE); Anthony Lernihan, Oranmore Galway (IE)

(73) Assignee: FMR LLC, Boston, MA (US)

( * ) Notice: Subject to any disclaimer, the term of this patent is extended or adjusted under 35 U.S.C. 154(b) by 343 days.

(21) Appl. No.: 15/838,691

(22) Filed: Dec. 12, 2017

(65) Prior Publication Data

US 2019/0180039 A1  Jun. 13, 2019

(51) Int. Cl.
| | |
|---|---|
| *G06F 21/60* | (2013.01) |
| *G06F 21/62* | (2013.01) |
| *G06F 8/70* | (2018.01) |
| *G06F 11/36* | (2006.01) |
| *G06Q 10/06* | (2012.01) |

(52) U.S. Cl.
CPC .............. *G06F 21/604* (2013.01); *G06F 8/70* (2013.01); *G06F 11/3672* (2013.01); *G06F 21/6218* (2013.01); *G06Q 10/0635* (2013.01)

(58) Field of Classification Search
CPC ...... G06F 21/604; G06F 8/70; G06F 11/3672; G06F 21/6218; G06Q 10/0635
See application file for complete search history.

(56) References Cited

U.S. PATENT DOCUMENTS

| | | | | |
|---|---|---|---|---|
| 9,226,155 | B2 * | 12/2015 | Dabbiere | H04W 12/0609 |
| 9,294,464 | B2 | 3/2016 | Marum et al. | |
| 9,298,899 | B1 * | 3/2016 | Moloian | H04L 63/101 |
| 9,413,786 | B1 * | 8/2016 | Boss | G06Q 10/0635 |
| 9,807,094 | B1 * | 10/2017 | Liu | H04L 63/10 |
| 9,851,966 | B1 * | 12/2017 | Barday | G06Q 10/06 |
| 9,923,918 | B2 * | 3/2018 | Nicodemus | G06F 21/6218 |
| 9,954,865 | B2 * | 4/2018 | Salem | G06F 21/44 |
| 9,971,894 | B2 * | 5/2018 | Shear | G06F 21/57 |
| 10,019,588 | B2 * | 7/2018 | Garcia | G06F 21/6245 |
| 10,147,065 | B1 * | 12/2018 | Yiftachel | G06Q 10/0635 |
| 10,523,675 | B2 * | 12/2019 | Bhabbur | G06F 21/62 |
| 2013/0041711 | A1 * | 2/2013 | Girard | G06Q 50/165 |
| | | | | 705/7.28 |

(Continued)

*Primary Examiner* — Joseph P Hirl
*Assistant Examiner* — Stephen T Gundry
(74) *Attorney, Agent, or Firm* — Proskauer Rose LLP (57) ABSTRACT

A computerized method is provided for automatically authorizing an access request from a user to perform a task with respect to a computing application of an application lifecycle management (ALM) system. The computerized method includes receiving, by a computing device, the access request from the user to perform the task with respect to the application in the ALM system and calculating, by the computing device, a risk score associated with the access request. Calculating the risk score includes determining a plurality of factors including: (i) at least one factor associated with the application indicative of an importance level of the application and (ii) at least one factor characterizing technical experience of the user, and computing the risk score as a weighted sum of the plurality of factors. The method further includes determining, by the computing device, whether to authorize the user access request based on the risk score.

20 Claims, 4 Drawing Sheets

(56) References Cited

U.S. PATENT DOCUMENTS

| | | | |
|---|---|---|---|
| 2013/0227712 A1* | 8/2013 | Salem | G06F 21/6218 726/30 |
| 2013/0311660 A1* | 11/2013 | Dabbiere | H04L 12/1467 709/225 |
| 2013/0312057 A1* | 11/2013 | Dabbiere | H04L 63/107 726/1 |
| 2014/0004832 A1* | 1/2014 | Dabbiere | H04W 76/10 455/411 |
| 2014/0380423 A1* | 12/2014 | Wong | H04L 63/08 726/4 |
| 2015/0051945 A1* | 2/2015 | Lawless | G06Q 10/0635 705/7.28 |
| 2015/0089601 A1 | 3/2015 | Marum et al. | |
| 2015/0332184 A1* | 11/2015 | Osborn | G06Q 10/0639 705/7.28 |
| 2015/0381631 A1* | 12/2015 | Salem | H04L 63/102 726/4 |
| 2016/0078203 A1* | 3/2016 | Moloian | G06F 21/62 726/17 |
| 2016/0163186 A1* | 6/2016 | Davidson | G06Q 50/16 340/506 |
| 2016/0226911 A1* | 8/2016 | Boss | H04L 63/20 |
| 2016/0307133 A1 | 10/2016 | Kour et al. | |
| 2016/0315947 A1* | 10/2016 | Boss | G06Q 50/01 |
| 2017/0013131 A1 | 1/2017 | Craib | |
| 2017/0200006 A1* | 7/2017 | Gershoni | G06Q 50/10 |
| 2017/0201545 A1* | 7/2017 | Nicodemus | G06F 21/55 |
| 2017/0206365 A1* | 7/2017 | Garcia | G06F 21/6245 |
| 2017/0251013 A1* | 8/2017 | Kirti | H04L 63/1416 |
| 2017/0255790 A1* | 9/2017 | Barrett | G16B 20/20 |
| 2017/0293763 A1* | 10/2017 | Shear | G06F 21/6218 |
| 2017/0357502 A1* | 12/2017 | Barday | G06F 8/70 |
| 2017/0364700 A1* | 12/2017 | Goldfarb | G06F 21/64 |
| 2018/0032736 A1* | 2/2018 | Inagaki | G06F 3/04817 |
| 2018/0068567 A1* | 3/2018 | Gong | H04W 4/022 |
| 2018/0307481 A1* | 10/2018 | Ganesan, Sr. | G06F 8/71 |
| 2019/0122149 A1* | 4/2019 | Caldera | G06Q 10/0635 |
| 2019/0141041 A1* | 5/2019 | Bhabbur | H04L 9/0643 |

\* cited by examiner

SYSTEMS AND METHODS FOR DYNAMIC APPLICATION MANAGEMENT

TECHNICAL FIELD

This application relates generally to systems, methods and apparatuses, including computer program products, for automatically authorizing a user access request with respect to a computing application of an application management system.

BACKGROUND

Large software projects are difficult to management as there can be many developers collaborating on each project, thus introducing problems, defects or issues from various sources at different stages of a project's development cycle. Further adding to such complexity, the developers are often located in geographically different locations. Managing these complexities requires a comprehensive view of the characteristics of the resources involved. Existing software management systems use authorization rules to control developers' access to projects. For instance, their access requests are reviewed and authorized based on one or more rules implemented by system administrators. These authorization rules are manually implemented, labor intensive and error prune. Further, the process cannot be easily document for audit purposes. Another shortcoming is that existing software management systems often use a single factor to determine if an action with respect to a computing application is permitted and then statically apply that permission without any consideration of other factors or any last-minute changes to the factor being considered.

SUMMARY

The present invention provides systems, methods and apparatuses for automatically controlling user access for the purpose of managing changes to a computing application of an application management system. For example, the present invention authorizes a user's access to a computing application by considering multiple factors that are both user-centric and application-centric. Further the present invention allows update to these factors in a feedback manner to provide just-in-time authorization of user access.

In one aspect, the invention features a computerized method for automatically authorizing an access request from a user to perform a task with respect to a computing application of an application lifecycle management (ALM) system. The computerized method includes receiving, by a computing device, the access request from the user to perform the task with respect to the computing application in the ALM system, and calculating, by the computing device, a risk score associated with the access request. Calculating the risk score comprises determining, by the computing device, a plurality of factors including: (i) at least one factor associated with the computing application indicative of an importance level of the computing application and (ii) at least one factor characterizing technical experience of the user, and computing, by the computing device, the risk score as a weighted sum of the plurality of factors. The also further includes comparing, by the computing device, the risk score to one or more thresholds, and determining, by the computing device, whether to authorize the access request based on the comparing step. The method further includes altering, by the user via the computing device if the access request is granted, the computing application, which in turn alters at least one function of the computing device.

In another aspect, a computer program product, tangibly embodied in a non-transitory computer readable storage device, is provided for automatically authorizing an access request from a user to perform a task with respect to a computing application of an application lifecycle management system. The computer program product includes instructions operable to cause a computing device to receive the access request from the user to perform the task with respect to the computing application in the application lifecycle management system and calculate a risk score associated with the access request. Instructions operable to cause the computing device to calculate the risk score comprises instructions operable to cause the computing device to determine a plurality of factors including: (i) at least one factor associated with the computing application indicative of an importance level of the computing application and (ii) at least one factor characterizing technical experience of the user and compute the risk score as a weighted sum of the plurality of factors. The computer program product further includes instructions operable to cause a computing device compare the risk score to one or more thresholds, and determine whether to authorize the access request based on the comparing step.

In yet another aspect, a computerized system is provided for automatically authorizing an access request from a user to perform a task with respect to a computing application of an application lifecycle management system. The system includes an input module configured to receive the access request from the user to perform the task with respect to the computing application in the application lifecycle management system. The system includes a storage module configured to store a plurality of factors including at least one factor associated with the computing application indicative of an importance level of the computing application and at least one factor characterizing technical experience of the user. The system also includes an evaluation module configured to calculate a risk score associated with the access request as a weighted sum of the plurality of factors in the storage module, and compare the risk score to one or more thresholds. The system further includes an authorization module configured to determine one or more authorization rules in relation to the access request based on the comparison of the risk score to the one or more thresholds by the evaluation module. In some embodiments, the system additionally includes an asset registry module configured to maintain a usage profile corresponding to the user. The usage profile comprises at least one the plurality of factors, the risk score, and the authorization rules.

Any of the above aspects can include one or more of the following features. In some embodiments, comparing the risk score to one or more thresholds includes comparing the risk score to a first acceptance threshold, and authorizing the access request from the user if the risk score exceeds the first acceptance threshold. In some embodiments, the risk score can be compared to a second acceptance threshold, if the risk score does not exceed the first acceptance threshold, and one of the following actions is performed: (a) reject the access request if the risk score does not exceed the second acceptance threshold; or (b) conduct a second level risk analysis if the risk score exceeds the second acceptance threshold, but does not exceed the first acceptance threshold.

In some embodiments, conducting the second level risk analysis comprises (i) calculating a probability that the user introduces a defect if the access request is granted, (ii) calculating a risk profile for the defect based on the probability, wherein the risk profile is indicative of an extent of risk associated with the defect, (iii) comparing the risk profile to a first risk threshold, and (iv) rejecting the access request if the risk profile exceeds the first risk threshold. The defect probability can be computed using a supervised learning technique. In some embodiments, the risk profile is compared to a second risk threshold, if the risk profile does not exceed the first risk threshold, and one of the following actions is performed: (a) accept the access request if the risk profile does not exceed the second risk threshold; or (b) conduct a third level risk analysis if the risk profile exceeds the second risk threshold, but does not exceed the first risk threshold.

In some embodiments, conducting the third level risk analysis includes (i) generating a compensation score by performing at least one of reviewing a work product associated with the task or scanning the work product for security risks, (ii) adjusting the risk profile using the compensation score, and (iii) repeating the second level risk analysis based on the adjusted risk profile to determine whether to authorize the access request.

In some embodiments, the at least one factor characterizing the user comprises a technical skill level, a performance rating, or a number of years of experience. In some embodiments, the at least one factor associated with the computing application comprises a type of the computing application and a lifecycle stage of the computing application. The lifecycle stage of the computing application can comprise one of concept, plan, development, integration, test or deployment stage. The type of the computing application can comprise a plan, build, source, test or deployment type. In some embodiments, the at least one factor associated with the computing application further comprises a criticality score, a security score, a maturity score, or a risk score of the computing application.

In some embodiment, performance of the user within the application lifecycle management system can be tracked and the at least one factor characterizing the user can be automatically updated based on the tracked performance.

In some embodiments, determining whether to authorize the access request comprises defining a scope of user access with respect to the computing application that includes granting at least one of read or write privilege with respect to the computing application. Further, a profile of usage corresponding to the user can be updated to include at least one of the plurality of factors, the risk score, and the scope of user access. In some embodiments, the profile of usage is used to evaluate a subsequent authorization request from the user.

In some embodiments, the access request comprises committing code to the application lifecycle management system with respect to the computing application.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION

Figure 1:
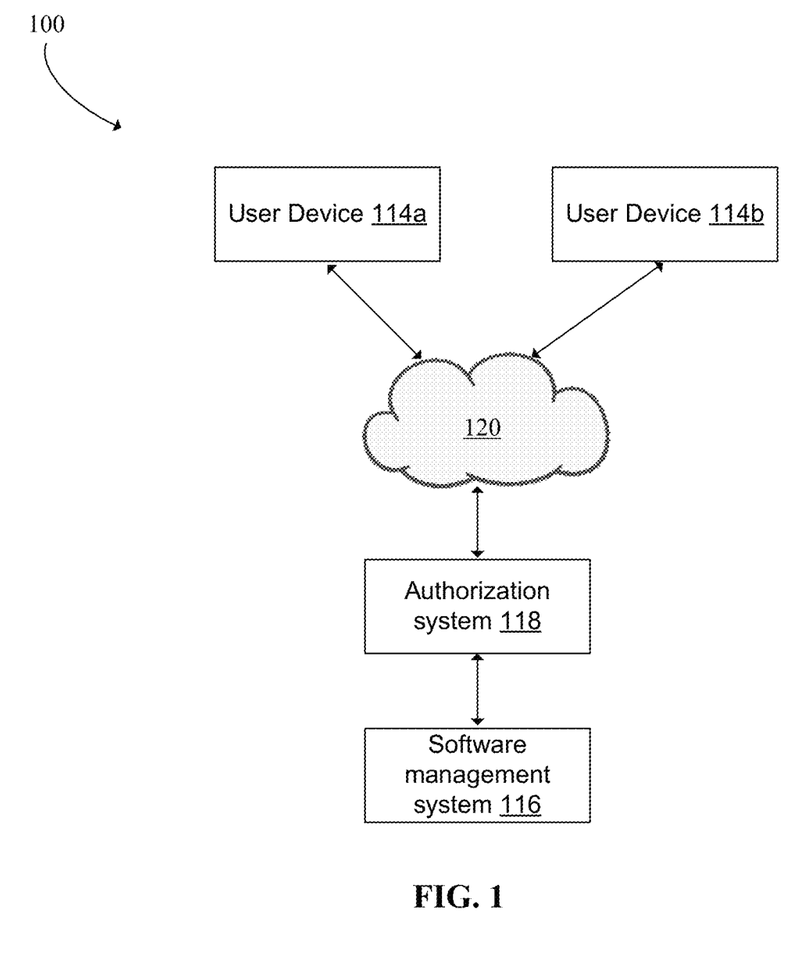
FIG. 1 is a block diagram of a user authorization system, according to an illustrative embodiment of the invention.

FIG. 1 is a block diagram of a user authorization system within a network environment 100, according to an illustrative embodiment of the invention. The network environment 100 includes one or more user computing devices (hereinafter referred to as user devices) 114, an authorization system 118, a software management system 116, and a communications network 120. In the context of the present invention, the term "development" refers to activities including software development, software maintenance, application life cycle management, or the like.

The communications network 120 enables the components of the development environment 100 to communicate with each other to perform the authorization processes as described herein. The communications network 120 may be a local network, such as a LAN, or a wide area network, such as the Internet and/or a cellular network. In some embodiments, the network 120 is comprised of several discrete networks and/or sub-networks (e.g., cellular to Internet) that enable the components of the development environment 100 to communicate with each other.

A developer (hereinafter referred as a "user") can make, via at least one of the user devices 114 over the communications network 120, a request to the authorization system 118 to access a computerized resource (e.g., a computing application) maintained by the software management system 116. Each of the user devices 114 can be a computing device with a processor and memory that can execute instructions and network connectivity that may send or receive data from the internet. Exemplary user devices 114 include but are not limited to desktop computers, laptop computers, tablets, mobile devices, smartphones, and internet appliances. It should be appreciated that other types of computing devices that are capable of connecting to the components of the development environment 100 can be used without departing from the scope of invention.

The software management system 116 is configured to provide product lifecycle management, such as governance, development, and maintenance of computing applications. In some embodiments, the software management system 116 is an application lifecycle management (ALM) system. The system includes a set of processes for requirements management, software architecture, computer programming, software testing, software maintenance, change management, integration, project management, release management, and such.

The authorization system 118 is a combination of hardware, including one or more processors and one or more physical memory modules and specialized software engines that execute on one or more processors. In some embodiments, the authorization system 118 is configured to receive a request from a user to access a resource (e.g., a computing application) of the software management system 116 (e.g., for the purpose of performing a task with respect to the requested resource). The authorization system 118 can automatically determine whether this request should be granted. Thus, the authorization system 118 is configured to control access for the purpose of managing changes to computing applications. The authorization system 118 can be a stand-alone system or integrated with, such as a part of, the software management system 116. In some embodiments, the authorization system 118 is implemented as an extension of the software management system 116 such that the authorization system 118 can intercept the incoming access request to the software management system 116 and provide in real-time, or near real-time, dynamic authorization (e.g., elevating the privileges of the requestor with respect to the request) based on information provided by the software management system 116. In some embodiments, authorization system 118 is implemented as a stand-alone system that can perform authorization of a user's request, error detection and self-learning based on the user's previous actions, without any additional feedback from the software management system 116.

Figure 2:
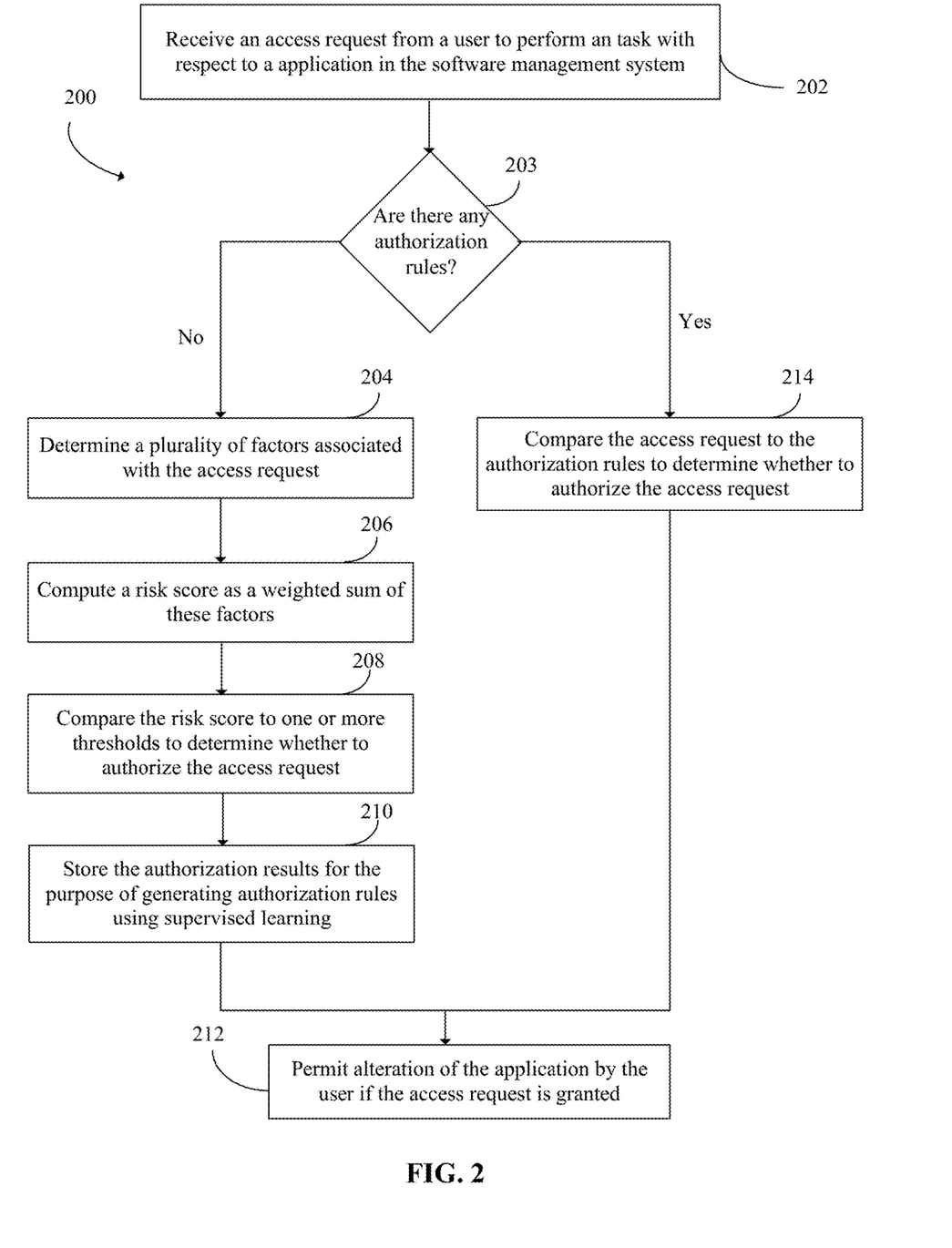
FIG. 2 is an exemplary process for automatically authorizing a user request to access a computing application of the software management system of FIG. 1, according to an illustrative embodiment of the present invention.

FIG. 2 is an exemplary process 200 executed by the authorization system 118 for automatically authorizing a user request to access a computing application of the software management system 116 of FIG. 1, according to an illustrative embodiment of the present invention. The process 200 includes receiving the access request from the user to perform a task with respect to the computing application in the software management system 116 (step 202) and determining if there is any existing authorization rule defined with respect to the requested application (step 203). If there are no existing authorization rules for the requested computing application, the process 200 proceeds to determine a plurality of factors associated with the access request (step 204), compute a risk score as a weighted sum of these factors (step 206), compare the risk score to one or more thresholds to determine whether to authorize the access request (step 208), and store the authorization results for the purpose of generating one or more authorization rules using a supervised learning approach (step 210). However, if there are existing authorization rules for the requested computing application, the process 200 can automatically compare the access request to these rules to automatically determine whether to authorize the access request (step 214). The process 200 is adapted to permit changes to the requested computing application by the user (step 210) if the access request is granted at least at one of step 210 or 214.

Specifically, at step 202, the authorization system 118 is configured to receive a request from a user to access a computing application (e.g., a software program) maintained by the software management system 116 (e.g., an ALM system). The request can comprise the user seeking permission to read and/or write to the computing application or commit code with respect to the computing application via the software management system 116. The request may be made by the user from a user device 114 via the communications network 120. In some embodiments, the user is a registered user of the software management system 116 and can be identified by the software management system 116 by at least one of a username or password.

At step 203, upon receiving the user request, the authorization system 118 can first authenticate the user to verify the identity of the user as well verify the existence of the requested computing application in the software management system 116. The authorization system 118 is also adapted to determine if there is any existing authorization rule saved in relation to the requested computing application. The authorization rules can be developed through a supervised learning approach described in detail below.

If there are no existing authorization rules for the requested computing application, process 200 proceeds to step 204, where the authorization system 118 is configured to determine a number of factors associated with the request for the purpose of authorizing the request. The factors generally include one set of factors related to the computing application and another set of factors characterizing the user. Some of these factors may be dynamic, which may require frequent recalculation, such as for each new user request. Some of these factors may be more static and may be reused in later requests for the same user and/or the same application.

The application-related factors, which are relatively more dynamic, include factors that are indicative of the importance of the computing application, an ALM phase of the computing application, and/or a lifecycle stage of the computing application. The Application-related factors indicative of the importance of the computing application can include a criticality level of the computing application, a security setting of the computing application (i.e., the higher the security level, the more important the computing application), a maturity level (i.e., the lower the maturity level of the computing application, the less important the application), a technical maturity level (i.e., the lower the maturity level of the technology being used to develop the computing application, the less important the application), and/or a risk profile (i.e., the more willing a business is to accept an outage of the computing application, the less important the application). Each of these factors can be a numerical value corresponding to a sliding-scale evaluation, such as a value on a scale of 1 to 5. Another application-related factor can indicate the ALM phase associated with the computing application. Because different developmental phase of a computing application have different levels of risk associated with introducing changes to the computing application, this factor can be assigned a numerical value quantifying such a risk. As an example, each ALM phase (e.g., planning, building, source, test or deploy) is assigned a risk rating from 1 to n (an integer). For instance, a computing application related to (i) planning corresponds to a value of 1, (ii) building corresponds to a value of 2, (iii) source corresponds to a value of 3, (iv) test corresponds a value of 4 and (v) deploy corresponds to a value of 5. Yet another application-related factor indicates a lifecycle stage of the computing application. Because the later a computing application is in the development cycle, the greater the risk associated with introducing changes to the computing application, this factor can be assigned a numerical value quantifying such a risk. In some embodiments, each development lifecycle stage (e.g., conception, planning, development, integration, testing and deployment) is assigned a numerical risk value. For example, a computing application related to (i) conception corresponds to a value of 0.5, (ii) planning corresponds to a value of 1, (iii) development corresponds to a value of 1.5, (iv) integration corresponds to a value of 2, (v) testing corresponds to a value of 2.5, and (vi) deployment corresponds to a value 3.

In some embodiments, the application-related factors also include asset registry information, which are subjected to less frequent changes over time in comparison to other application related factors. The asset registry information includes risk profiles, technology profiles and/or impact profiles assigned to groups of computing applications that are assembled together based on certain industry standards. These profiles can also be used to determine the relative importance of a given computing application depending on which group it is assigned to.

The user-related factors, which can be more static in comparison to the application-related factors, measure the relative technical expertise of the user requesting the document access. The user-related factors can include a factor indicating the job level/grade of the user, a job family factor indicating the job grouping the user belongs to, a factor indicating the performance rating of the user (based on, for example, the number of defects and/or commits associated with the user), a factor indicating the amount of time the user has been employed with the organization, and a factor indicating the technical skill level of the user. A geographical location of the user can also be a user-related factor. Each of these factors can be assigned a numerical value corresponding to a sliding-scale evaluation, such as a value on a scale of 1 to 5.

In some embodiments, the application-related factors and the user-related factors are stored in a database for future usage in relation to the same user and/or the same computing application. As described above, some of these factors are relatively dynamic and some are relatively static, which affect how often they need to be updated in the database. For example, the factor related to a user's experience level or performance results may change less rapidly over time than the factor related to an application's development life cycle.

At step 206, the authorization system 118 can compute a risk scored based on the application-related and user-related factors, some of which are relatively dynamic and some are relatively static. Thus, the resulting risk score represents a combination of static and dynamic data. For example, the risk score can be a product of two or more of the factors described above, such as a product of factor(s) indicating the importance of the requested computing application, factor(s) indicating an ALM phase of the computing application, factor(s) indicating a lifecycle stage of the computing application, and factor(s) characterizing the user. In some embodiments, a weight can be assigned to each factor to manipulate the relative importance of the corresponding factor in the overall risk score calculation.

Figure 3:
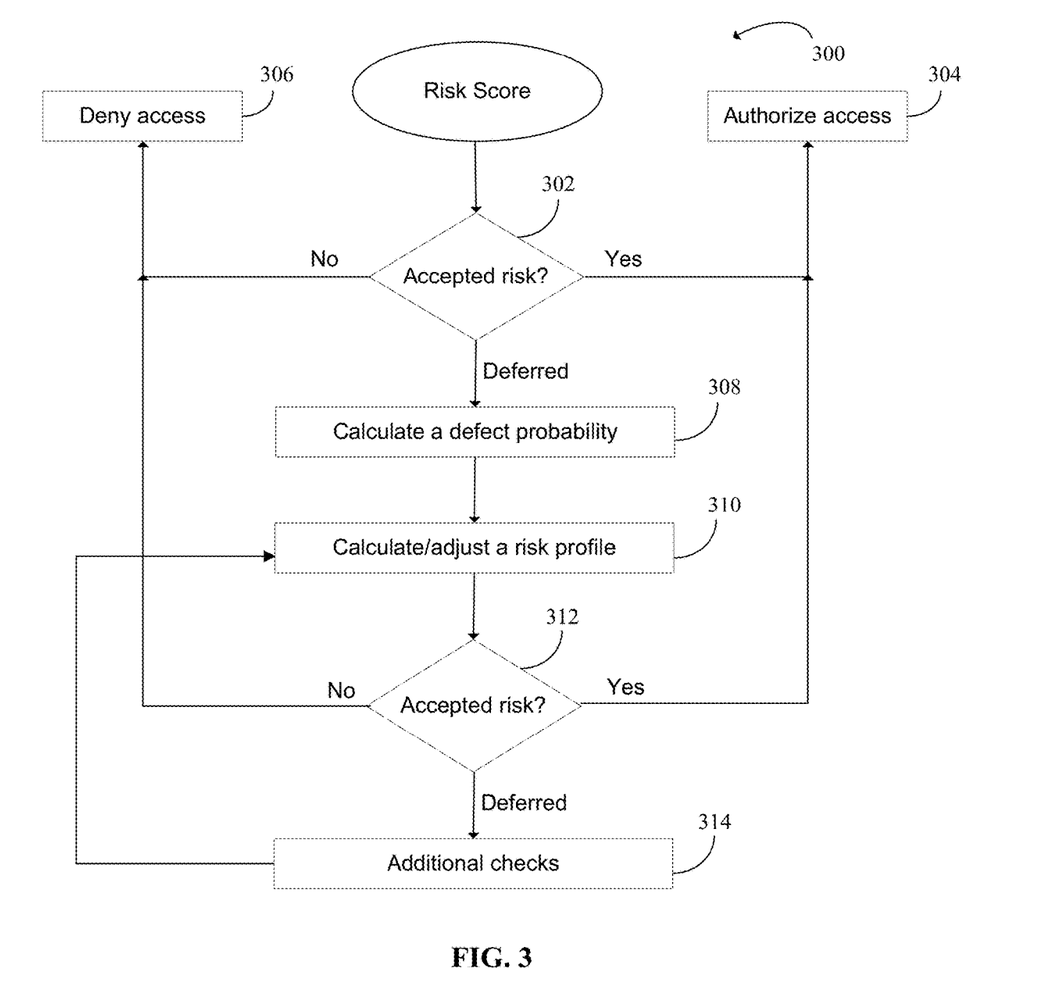
FIG. 3 is an exemplary process for determining authorization of a user request, according to an illustrative embodiment of the present invention.

At step 208, the authorization system 118 is adapted to compare the risk score to one or more predetermined thresholds to determine whether to authorize the user access request. FIG. 3 is an exemplary process 300 for determining authorization of a user request based on a calculated risk score, according to an illustrative embodiment of the present invention. As shown, at step 302, the risk score from step 206 is evaluated to determine whether the risk associated with the user access request is acceptable. Determination of the acceptability of the associated risk can be based on comparing the risk score to a first acceptance threshold and authorizing the access request at step 304 if the risk score exceeds the first acceptance threshold. However, if the risk score does not exceed the first acceptance threshold, the authorization system 118 can compare the risk score to a second acceptance threshold that is lower than the first acceptance threshold. If the risk score does not exceed the second acceptance threshold, the authorization system 118 is adapted to reject the access request by denying the user access to the requested computing application at step 306. If the risk score exceeds the second acceptance threshold (and is below the first acceptance threshold), the authorization system 118 is adapted to conduct a second level analysis to further determine the acceptability of the user request.

The second level analysis involves calculating a probability of the user introducing a type of defect to the computing application if the access request were to be granted (step 308) and calculating a risk profile for the defect based on the probability to evaluate the extent of risk associated with the particular defect (step 310). Specifically, at step 308, the authorization system 118 can calculate the probability of the user introducing a type of defect to the computing application using a supervised learning technique. For example, the probability of the user committing a defect of a type Xi can be based on (i) the number of years of experience of the user, where a more inexperienced user is more likely to introduce a defect, (ii) the change in complexity of the computing application if authorization were to be granted, (iii) the change in code coverage if authorization were to be granted, and (iv) the dependencies affected. Exemplary defect types include functional defects (e.g., a computing application doesn't work as intended), security defects (e.g., potential data leaks in a computing application), and/or performance defects (e.g., the application doesn't scale as intended). There can be a different probability associate with the occurrence of each of the different defect types.

For example, the effect of the change in complexity of the computing application (Complexity Probability) on a defect type probability can be evaluated using the following equation:

ComplexityFactor=(Change in Complexity/Starting complexity)*log $N$(starting complexity)

Complexity Probability=ComplexityFactor/(ComplexityFactor+$B$)

In the above equations, N, which has the ability to raise or lower the resulting Complexity Probability by an appropriate amount, and B, which can normalize the Complexity Probability, are determined using training data. In some embodiments, calculation of a risk profile for a particular defect type RPXi (step 310) is accomplished using the equation below:

RPXi=(tan $h$((DPXi*RS)*C)−D)

In the above equation, DPXi represents an array of values indicating the probably of a particular defect type (i.e. security, performance, functional) occurring. This array of values can be obtained from the probability calculation at step 308. RS is a risk score that is a weighted value calculated from multiple configurable inputs, which represents the level of risk that an application or product team is willing to accept in relation to the particular defect type. C represents normalization of the rate of increase of the function RPXi, which can be calibrated to alter the number of requests that are referred to the workflow for further analysis. D represents a vertical shift/offset to the function RPXi, which can be calibrated to increase or decrease the number of changes accepted, rejected, or referred, while the rate of the function remains constant.

At step 312, if it is determined that the risk profile calculated exceeds a first predefined acceptable risk threshold, the authorization system 118 is adapted to reject the user request to access the desired computing application by executing step 306. If the risk profile does not exceed the first predefined acceptable risk threshold, the authorization system 118 is adapted to compare the risk profile with a second predefined acceptable risk threshold that is lower than the first acceptable risk threshold. If the risk profile also does not exceed the second acceptable risk threshold, the authorization system 118 is adapted to accept the user request to access the desired computing application by executing step 304. However, if the risk profile exceeds the second acceptable risk threshold (but does not exceed the first acceptable risk threshold), the authorization system 118 is adapted to conduct a third level analysis to further determine the acceptability of the user request.

At step 314, the third level analysis involves generating a compensation score for the risk profile calculated at step 310, adjusting the risk profile by adding the compensation score to the risk profile at step 310, and repeating step 312 with respect to the adjusted risk profile to determine whether to deny or authorize the access request. Generating the compensation score at step 314 can include assigning a score to one or more of (i) results from code review of work products produced by the user, (ii) results from security scans of the requested computing application, and (iii) results from performance test of the user. Generally, favorable code review results, security scan results and/or performance test results can lower the risk profile and improve the acceptance evaluation at step 312.

Referring back to the process 200 of FIG. 2, after a decision of whether to authorize the user request is made at step 208, this decision, along with any pertinent information used to make the decision (e.g., information generated at steps 204-208), is stored in a database for the purpose of automatically generating authorization rules using, for example, a supervised learning technique. In some embodiments, the supervised learning technique uses as inputs the various dynamic and/or static factors of step 204, the feedback from the authorization step 208, and any manual tuning parameters provided by an operator to generate a set of rules for automatically determining access risks related to the requested computing application. Specifically, these rules can define one or more conditions/criteria under which access to the computing application is permitted. For example, authorization rules can control the ability of a user to commit code to source control, to approve pull and/or merge requests, to close a Story or Defect, to execute a DevOps pipeline, or to deploy an update to a production. The resulting authorization rules for a given computing application can be stored in a database and used to (i) authorize future requests with respect to the same computing application and/or (ii) validate the authorization outcome determined from steps 204-208.

Therefore, in some embodiments, if authorization rules are already defined for a requested computing application (step 203), the authorization system 118 can choose to use the authorization rules to dynamically determine whether to authorize the access request (step 214) instead of implementing the more extensive determination process of steps 204-208. This can be accomplished by comparing information related to the access request to the one or more rules to determine whether certain access conditions or criteria are met. Alternatively, even if the authorization rules exist, the authorization system 118 can still execute steps 204-208 to make an authorization determination and use the authorization rules to validate the determination. At step 212, the authorization system 118 is adapted to permit the user access to the requested computing application if the authorization determination from steps 204-208 and/or from step 214 grants the user's access request.

Figure 4:
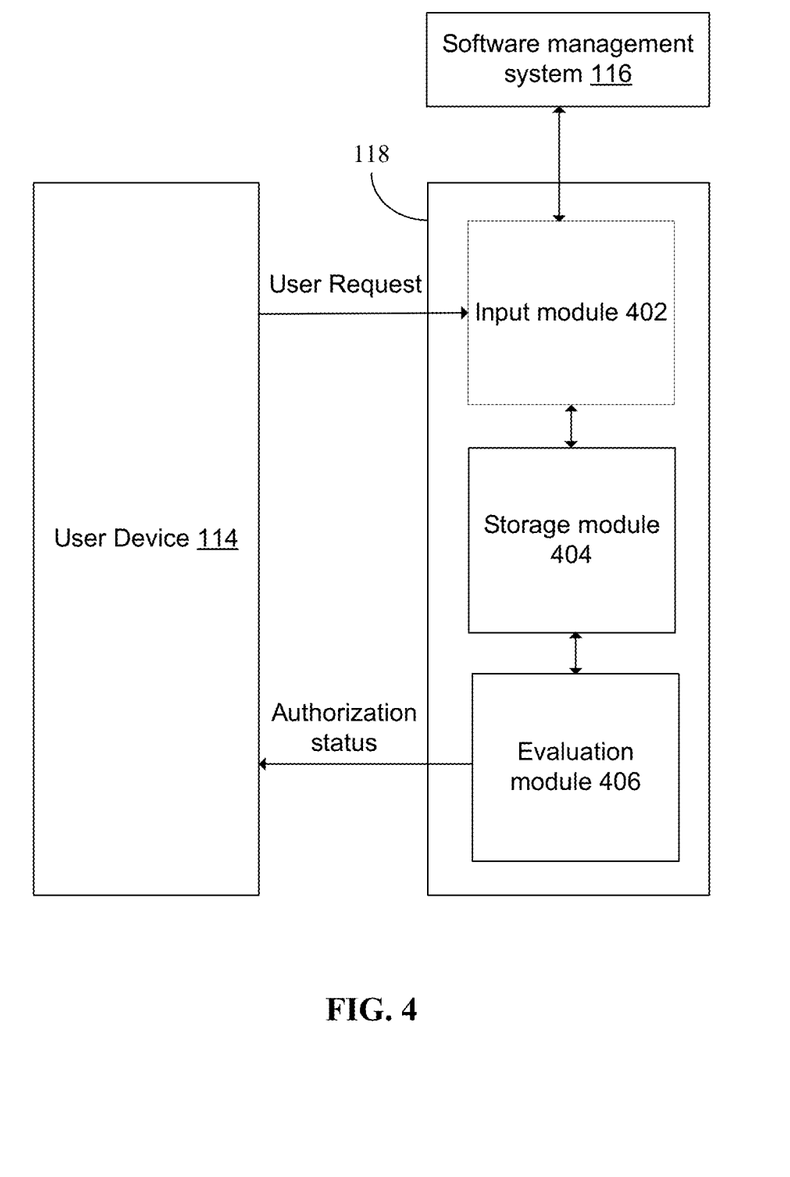
FIG. 4 is an exemplary block diagram of the authorization system of FIG. 1, according to an illustrative embodiment of the present invention.

FIG. 4 is an exemplary block diagram of the authorization system 118 of FIG. 1, according to some embodiments of the present invention. As shown, the authorization system 118 includes an input module 402, a storage module 404, and an evaluation module 406. The input module 402 is configured to receive an access request from a user via a user device 114 and parse the request to obtain pertinent data, such as the identity of the user, an identification of the requested computing application and a task desired to be performed by the user with respect to the requested computing application. In some embodiments, the input module 402 collaborates with the software management system 116 to determine such information. The evaluation module 406 is adapted to execute the process 200 to determine whether to grant the user's access request. Both the input module 402 and the evaluation module 406 can interact with the storage module 404 to save information related to the user and the requested computing application into the storage module 404. In some embodiments, the storage module 404 is configured to store information such as the various factors related to the user and the requested computing application, any authorization rules generated, and permissions granted to a user at different points in time. For example, a profile of usage corresponding to a user can be established and maintained to include at least one of the various factors described above, any risk scores calculated, and the scope of user access in the past. This profile of usage can be used to evaluate a subsequent authorization request from the user. In some embodiments, the storage module 404 implements a blockchain-based smart contract to record the data. This type of storage reduces the burden on governance as the data is easily accessible for reporting and auditing purposes.

In some embodiments, the factors related to the user and the requested computing application that are stored in the storage module 404 can be automatically updated based on feedback received from the software management system 116. Specifically, the authorization system 118, in conjunction with the software management system 116, can track the performance of a user and/or the status of a computing application within the software management system and automatically update any application and/or user-related factors based on the tracking. For example, a user's personal rating, which is captured by the factors characterizing the user, can be updated based on the most recent performance review of the user captured by the software management system 116. As another example, the status of a computing application, which is captured by the application-related factors, can be updated based on the progress of the computing application within a project, as captured by the software management system 116. The update can be performed periodically or on a continuous basis.

In an exemplary implementation of the authorization system 118 of the present invention, when a new user joins a new project involving the development of at least one computing application, the only permission granted to that user by the authorization system 118 may be write access to feature branches of the computing application. However, as the user commits code of sufficient quality with a low number of defects, good quality code coverage and no security issues, the user's rating (as reflected by the personal factors related to the user) is like to increase. Once the rating reaches a certain level (i.e. advanced), the user is authorized by the system 118 to become a code reviewer, thereby granting him permission to accept/reject pull requests and have write access to the "develop" branch of the project. Further, as the project moves into the Integration phase and the user's rating continues to increase, the authorization system 118 is likely to grant the user the permission to create release branches and/or write access to "master." The user can also be granted the right to execute release type jobs related to the computing application. During the same project, if another user's productivity decreases, code quality drops and/or the number of defects increases, the authorization system 118 is adapted to remove that user's right to review/approve pull requests, for example.

In another exemplary implementation of the authorization system 118 of the present invention, when a new user joins a new project involving the development of at least one computing application, the user is first assigned a set of minimum projects rights by the authorization system 118, which allows the user to check out code from a feature branch of the computing application, makes changes, and commit them back to the repository. Such a series of actions by the user triggers an update to the user's rating (as reflected by the personal factors related to the user). If the user attempts to merge this code from the feature back into the "develop" integration branch, the authorization system 118 is adapted to intercept this request, reevaluate the factors related to the user and determine if the user has insufficient rights to perform this merge. If the authorization system 118 determines that the user does not have sufficient rights to perform this task, the user is informed of this decision and advised to raise a pull request to have the code reviewed by a more experienced developer. If the user subsequently creates the pull request as advised, which is then reviewed and approved by a more experienced developer, the resulting successful merge triggers a favorable update to the user's rating (as reflected by the personal factors related to the user). Such a feedback is thus captured by the authorization system 118 and used for future authorization decisions with respect to this user.

Generally, as the user's experience in this project or other projects grows, so does his rights. For example, the user can check out code onto a new feature branch of a computing application to make changes for a new story and commit the changes back to the repository. The success of this action can trigger update to the user's rating (as reflected by the personal factors related to the user). The user then attempts to merge the code directly into the "develop" integration branch of the computing application. The authorization system 118 is adapted to intercept this request and determine that the user has enough experience to be granted permission to perform the action based on the improvement in his personal rating. If the merge is completed and successful, it further triggers a favorable update to the user's personal rating. However, if the user subsequently makes another change to the code and deploys the code to production, but the deployment is a failure, this is likely to result in a downgrade of his personal rating (i.e., personal factors) by the authorization system 118. Therefore, if the same user now begins working on another computing application, at the merge step, the authorization system 118 may block the user's merge request due to the downgraded rating. The user can be informed of this decision and advised to raise a pull request to have the code reviewed prior to accepting it into the integration workflow.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile computing device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile computing device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed is:

1. A computerized method for automatically authorizing an access request from a user to perform a task with respect to a computing application of an application lifecycle management (ALM) system, the computerized method comprising:
   receiving, by a computing device, the access request from the user to perform the task with respect to the computing application in the ALM system;
   determining, by the computing device, whether there is at least one authorization rule predefined for the computing application, wherein the at least one authorization rule defines one or more criteria under which access to the computing application is permitted;
   when there is no authorization rule for the computing application based on the determining:
      calculating, by the computing device, a risk score associated with the access request, wherein calculating the risk score comprises:
         determining, by the computing device, a plurality of factors including: (i) at least one factor associated with the computing application indicative of an importance level of the computing application and (ii) at least one factor characterizing technical experience of the user,
         wherein the at least one factor characterizing technical experience of the user comprises a number of years of experience of the user; and
         computing, by the computing device, the risk score as a weighted sum of the plurality of factors;
      comparing, by the computing device, the risk score to one or more thresholds;
      determining, by the computing device, whether to authorize the access request based on the comparing step; and
      automatically generating, by the computing device, at least one authorization rule based on a supervised learning technique that uses as inputs the plurality of factors related to the computing application and the user;
   when there is at least one authorization rule predefined for the computing application, authorizing, by the computing device, the access request based on satisfaction of the one or more criteria associated with the authorization rule; and
   permitting, by the computing device, alteration of the computing application by the user, if the access request is granted.

2. The computerized method of claim 1, wherein the at least one factor associated with the computing application further comprises a type of the computing application and a lifecycle stage of the computing application.

3. The computerized method of claim 2, wherein the lifecycle stage of the computing application comprises one of concept, plan, development, integration, test or deployment stage.

4. The computerized method of claim 2, wherein the type of the computing application comprises a plan, build, source, test or deployment type.

5. The computerized method of claim 2, wherein the at least one factor associated with the computing application indicative of an importance level of the computing application comprises a criticality score, a security score, a maturity score, or a risk score of the computing application.

6. The computerized method of claim 1, wherein comparing the risk score to one or more thresholds comprises:
   comparing the risk score to a first acceptance threshold; and
   authorizing the access request from the user if the risk score exceeds the first acceptance threshold.

7. The computerized method of claim 6, wherein comparing the risk score to one or more thresholds further comprises:
   comparing the risk score to a second acceptance threshold, if the risk score does not exceed the first acceptance threshold; and
   performing one of: (a) rejecting the access request if the risk score does not exceed the second acceptance threshold; or (b) conducting a second level risk analysis if the risk score exceeds the second acceptance threshold, but does not exceed the first acceptance threshold.

8. The computerized method of claim 7, wherein conducting a second level risk analysis comprises:
   calculating a probability that the user introduces a defect if the access request is granted;
   calculating a risk profile for the defect based on the probability, wherein the risk profile is indicative of an extent of risk associated with the defect;
   comparing the risk profile to a first risk threshold; and
   rejecting the access request if the risk profile exceeds the first risk threshold.

9. The computerized method of claim 8, further comprising:
   comparing the risk profile to a second risk threshold, if the risk profile does not exceed the first risk threshold; and
   performing one of: (a) accepting the access request if the risk profile does not exceed the second risk threshold; or (b) conducting a third level risk analysis if the risk profile exceeds the second risk threshold, but does not exceed the first risk threshold.

10. The computerized method of claim 9, wherein conducting the third level risk analysis comprises:
    generating a compensation score by performing at least one of reviewing a work product associated with the task or scanning the work product for security risks;
    adjusting the risk profile using the compensation score; and
    repeating the second level risk analysis based on the adjusted risk profile to determine whether to authorize the access request.

11. The computerized method of claim 8, further comprising using a supervised learning technique to calculate the defect probability.

12. The computerized method of claim 1, wherein the at least one factor characterizing the user further comprises a technical skill level or a performance rating.

13. The computerized method of claim 1, further comprising:
    tracking, by the computing device, performance of the user within the application lifecycle management system; and
    automatically updating, by the computing device, the at least one factor characterizing the user based on the tracked performance.

14. The computerized method of claim 1, wherein determining whether to authorize the access request comprises defining a scope of user access with respect to the computing application that includes granting at least one of read or write privilege with respect to the computing application.

15. The computerized method of claim 14, further comprising updating a profile of usage corresponding to the user to include at least one of the plurality of factors, the risk score, and the scope of user access.

16. The computerized method of claim 15, further comprising using the profile of usage to evaluate a subsequent authorization request from the user.

17. The computerized method of claim 1, wherein the access request comprises committing code to the application lifecycle management system with respect to the computing application.

18. A computer program product, tangibly embodied in a non-transitory computer readable storage device, for automatically authorizing an access request from a user to perform a task with respect to a computing application of an application lifecycle management system, the computer program product including instructions operable to cause a computing device to:
    receive the access request from the user to perform the task with respect to the computing application in the application lifecycle management system;
    determine whether there is at least one authorization rule predefined for the computing application, wherein the at least one authorization rule defines one or more criteria under which access to the computing application is permitted;
    when there is no authorization rule predefined for the computing application:
       calculate a risk score associated with the access request, wherein instructions operable to cause the computing device to calculate the risk score comprises instructions operable to cause the computing device to:
          determine a plurality of factors including: (i) at least one factor associated with the computing application indicative of an importance level of the computing application and (ii) at least one factor characterizing technical experience of the user, wherein the at least one factor characterizing technical experience of the user comprises a number of years of experience of the user; and
          compute the risk score as a weighted sum of the plurality of factors;
       compare the risk score to one or more thresholds; and
       determine whether to authorize the access request based on the comparing step; and
       automatically generate at least one authorization rule based on a supervised learning technique that uses as inputs the plurality of factors related to the computing application and the user; and
    when there is at least one authorization rule predefined for the computing application, authorize the access request based on satisfaction of the one or more criteria associated with the authorization rule.

19. A computerized system for automatically authorizing an access request from a user to perform a task with respect to a computing application of an application lifecycle management system, the system comprising:
    an input module configured to receive the access request from the user to perform the task with respect to the computing application in the application lifecycle management system;
    a storage module configured to store a plurality of factors including at least one factor associated with the computing application indicative of an importance level of the computing application and at least one factor characterizing technical experience of the user, wherein the at least one factor characterizing technical experience of the user comprises a number of years of experience of the user; and
    an evaluation module configured to:
       determine whether there is at least one authorization rule in the storage module predefined for the computing application, the at least one authorization rule defining one or more criteria under which access to the computing application is permitted;

when there is no authorization rule predefined for the computing application, calculate a risk score associated with the access request as a weighted sum of the plurality of factors in the storage module, compare the risk score to one or more thresholds; and automatically generate at least one authorization rule in relation to the access request based on a supervised learning technique that uses as inputs the plurality of factors related to the computing application and the user; and when there is at least one authorization rule predefined for the computing application, authorize the access request based on satisfaction of the one or more criteria associated with the authorization rule.

20. The computerized system of claim 19, wherein the storage module is further configured to maintain a usage profile corresponding to the user, the usage profile comprising at least one the plurality of factors, the risk score, and the at least one authorization rule.

\* \* \* \* \*